US012789114B2

(12) United States Patent
Hwang et al.

(10) Patent No.: US 12,789,114 B2
(45) Date of Patent: Nov. 10, 2026

(54) SEPARATION SYSTEM

(71) Applicant: LG Chem, Ltd., Seoul (KR)

(72) Inventors: Moon Sub Hwang, Daejeon (KR); Jeong Seok Lee, Daejeon (KR); Jong Hun Song, Daejeon (KR); Se Won Baek, Daejeon (KR); Geun Tae Pak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 72 days.

(21) Appl. No.: 19/104,505

(22) PCT Filed: May 10, 2024

(86) PCT No.: PCT/KR2024/006335
§ 371 (c)(1),
(2) Date: Feb. 18, 2025

(87) PCT Pub. No.: WO2025/014067
PCT Pub. Date: Jan. 16, 2025

(65) Prior Publication Data

US 2026/0048343 A1 Feb. 19, 2026

(30) Foreign Application Priority Data

Jul. 7, 2023 (KR) ........................ 10-2023-0088159

(51) Int. Cl.
*B01D 3/14* (2006.01)
*B01D 3/32* (2006.01)

(52) U.S. Cl.
CPC ............. *B01D 3/322* (2013.01); *B01D 3/141* (2013.01); *B01D 3/32* (2013.01); *B01D 3/324* (2013.01)

(58) Field of Classification Search
CPC ........... B01D 3/141; B01D 3/32; B01D 3/322
See application file for complete search history.

(56) References Cited

U.S. PATENT DOCUMENTS 2,149,943 A * 3/1939 van Tonningen ...... B01D 3/143 196/108
3,437,584 A 4/1969 Hamblin
3,442,767 A * 5/1969 Hall ...................... B01D 3/322 203/99
3,871,969 A * 3/1975 Chapman ................ C01B 7/195 203/88
3,881,994 A * 5/1975 Fickel .................... B01D 3/322 203/1

(Continued)

FOREIGN PATENT DOCUMENTS

CN 206809811 U 12/2017
KR 930006403 B1 7/1993

(Continued)

OTHER PUBLICATIONS

Espacenet Translation of CN-206809811-U; retrieved Jun. 24, 2025.*

(Continued)

*Primary Examiner* — Jonathan Luke Pilcher
(74) *Attorney, Agent, or Firm* — Lerner David LLP

(57) ABSTRACT

A separation system may include a distillation column with a separation wall, a reboiler, and a condenser. The separation system may improves separation efficiency by changing a structure of a bottom area of a distillation column in an oligomerization process to improve a circulation system.

12 Claims, 4 Drawing Sheets

(56) References Cited

U.S. PATENT DOCUMENTS

| | | | | | |
|---|---|---|---|---|---|
| 4,490,215 | A * | 12/1984 | Bannon | B01D 3/14 | |
| | | | | 202/153 | |
| 4,601,788 | A * | 7/1986 | Bannon | B01D 3/322 | |
| | | | | 202/153 | |
| 10,377,690 | B1 | 8/2019 | Owens et al. | | |
| 2014/0231238 | A1 | 8/2014 | Bhargava et al. | | |
| 2021/0261872 | A1 | 8/2021 | Plennevaux et al. | | |
| 2022/0106251 | A1 | 4/2022 | Tretjak et al. | | |
| 2023/0002685 | A1 | 1/2023 | Moore et al. | | |
| 2024/0299859 | A1 | 9/2024 | Kim et al. | | |

FOREIGN PATENT DOCUMENTS

| | | | |
|---|---|---|---|
| KR | 101805875 | B1 | 12/2017 |
| KR | 102091679 | B1 | 3/2020 |
| KR | 20210031691 | A | 3/2021 |
| KR | 102362742 | B1 | 2/2022 |
| KR | 102439734 | B1 | 9/2022 |
| KR | 20230039362 | A | 3/2023 |
| WO | 2021233801 | A1 | 11/2021 |

OTHER PUBLICATIONS

International Search Report for Application No. PCT/KR2024/006335 mailed Aug. 13, 2024, 4 pages.

Chen,Z. et al.,"Classification and Comparison of Dividing Walls for Distillation Columns", Processes, MDPI, Jun. 2020, pp. 1-12, vol. 8.

Extended European Search Report including Written Opinion for Application No. 24839884.4 dated Jun. 16, 2025. 9 pages.

* cited by examiner

SEPARATION SYSTEM

CROSS-REFERENCE TO RELATED APPLICATIONS

This application is a national stage entry under 35 U.S. C. §371 of International Application No. PCT/KR2024/006335 filed on May 10, 2024, which claims priority to Korean Patent Application No. 10-2023-0088159 filed on Jul. 7, 2023, which are hereby incorporated by reference in their entirety.

TECHNICAL FIELD

The present disclosure relates to a separation system used in an oligomerization process using ethylene, and more particularly, to a separation system in which separation efficiency is improved by changing a sump structure in a distillation column.

BACKGROUND

Alpha-olefin is widely used commercially as an important material used as a comonomer, a detergent, lubricant, a plasticizer, and the like. In particular, 1-hexene and 1-octene has been widely used as a comonomer for controlling a density of polyethylene in a production of linear low-density polyethylene (LLDPE).

The alpha-olefin is typically prepared through the oligomerization reaction of ethylene, and a polymer is produced as a by-product during this preparation process. The polymer produced by a side reaction is contained in reactor effluents and is injected into the distillation column in a post-process. In this case, when the reactor effluents are directly injected into a feed stage tray, there is a very high risk of plugging phenomenon due to by-products such as polymers. Accordingly, conventionally, a method of directly injecting reactor effluents into a reboiler section has been considered.

However, the reactor effluent contains an unreacted ethylene in addition to by-products, and when the feed stage tray becomes the reboiler section, the separation efficiency of the unreacted ethylene is greatly reduced. Accordingly, there is a problem that the entire unreacted ethylene may not be recovered to the reactor, and some of the unreacted ethylene is leaked along with a bottom (BTM) product. In addition, such loss of raw materials causes financial loss.

Therefore, in order to solve the above problems, research is needed to prevent the plugging phenomenon due to polymer in the separation system in the ethylene reaction post-process, and at the same time, minimize the loss of the unreacted ethylene.

SUMMARY

Technical Problem

The problem to be solved by the present disclosure is to solve the problems mentioned in the Background of the present disclosure, and an object of the present disclosure provides a separation system capable of preventing a plugging phenomenon due to polymer in a post-process, and at the same time, recovering an unreacted ethylene without losing the unreacted ethylene by improving a sump structure at a lower portion of a distillation column.

However, problems to be solved by the present disclosure are not limited to the above-mentioned aspects. That is, other aspects that are not described may be obviously understood by those skilled in the art from the following disclosure.

Technical Solution

To solve the above problem, according to an aspect of the present disclosure, a separation system includes: a distillation column with a separation wall, a reboiler, and a condenser, in which the distillation column includes a bottom area including a first area and a second area partitioned with a first separation wall therebetween, a middle area including a plurality of trays, and a top area connected to the condenser.

In addition, the bottom area includes: a raw material supply port that is provided at an upper portion of the first area and has a reactor effluent containing ethylene and oligomer to the first area transferred therethrough; a first outlet that is provided at a lower portion of the first area and has a first stream containing the reactor effluent discharged therethrough; a first reflux inlet that is provided at an upper portion of the second area and has the first stream passing through the reboiler refluxing to the second area; and a second outlet that is provided at the lower portion of the second area and has a second stream containing the oligomer discharged therethrough.

In addition, the first separation wall includes an opening provided with a plurality of holes having different diameters.

Advantageous Effects

According to the separation system of the present disclosure, since the low-temperature liquid area and the high-temperature liquid area are partitioned due to the structure where the separation wall is installed in the sump at the lower portion of the distillation column and the separation wall includes an opening provided with a plurality of holes, the flowability can be formed by the temperature difference between the low-temperature liquid area and the high-temperature liquid area, so it is possible to more smooth the reboiler recirculation.

In addition, according to the separation system of the present disclosure, by designing the sump structure at the lower portion of the distillation column so that the reactor effluent or the solution (dropping liquid) that drops from the lowermost tray necessarily passes through the reboiler, it is possible to prevent the unreacted ethylene from being lost directly to the product outlet without passing through the reboiler, thereby improving the economic efficiency due to the raw material loss.

In addition, according to the separation system of the present disclosure, when the auxiliary separation structure including the auxiliary tray is provided at the reflux inlet into which the first stream that has passed through the reboiler flows, it is possible to additionally separate the unreacted gas such as the unreacted ethylene remaining in the first stream.

Effects which can be achieved by the present disclosure are not limited to the above-described effects. That is, other effects that are not described d may be obviously understood by those skilled in the art to which the present disclosure pertains from the following description.

DETAILED DESCRIPTION

Figure 1:
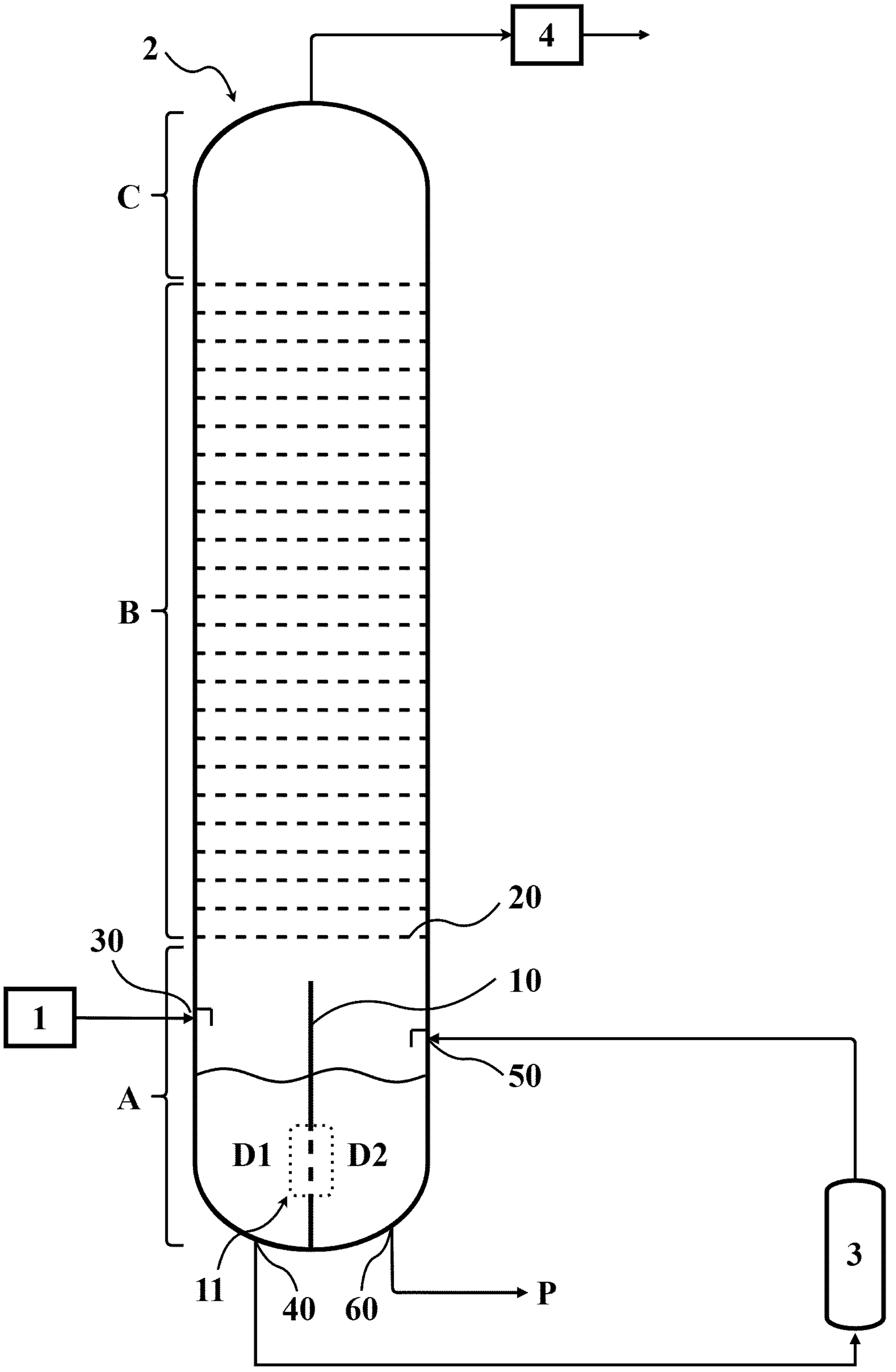
FIG. 1 is a process flow diagram of a separation system according to an aspect of the present disclosure.

Terms and words used in the present disclosure and claims are not to be construed as a general or dictionary meaning but are to be construed as meaning and concepts meeting the technical ideas of the present disclosure based on a principle that the inventors can appropriately define the concepts of terms in order to describe their own inventions in best mode.

Throughout the accompanying drawings, similar or related components will be denoted by similar reference numerals.

A singular form of a noun corresponding to an item may include one or more of the item, unless the relevant context clearly dictates otherwise.

In the present disclosure, each phrase such as "A or B," "at least one of A and B," "at least one of A or B," "A, B, or C," "at least one of A, B and C," and "at least one of A, B, or C" may include any one of items listed together in the corresponding one of those phrases, or all possible combinations thereof.

The term "and/or" includes a combination of a plurality of related described components or any one of the plurality of related described components.

Terms such as "first," "second," "$1^{st}$," or "$2^{nd}$" may simply be used to distinguish a component from another component, and do not limit the components in other respects (e.g., importance or order).

In addition, the terms such as 'front', 'rear', 'top', 'bottom', 'side', 'left', 'right', 'upper', 'lower', etc., used herein are defined based on the drawings, the shape and location of each component are not limited by this term.

It will be understood that terms 'include' or 'have' used in the present disclosure, specify the presence of features, numerals, steps, operations, components, parts mentioned in the present disclosure, or a combination thereof, but do not preclude the presence or addition of one or more other features, numerals, steps, operations, components, parts, or a combination thereof.

When a component is "connected," "coupled," "supported," or "contacted" with another component, this includes not only cases where the components are directly connected, coupled, supported, or contacted, but also cases where the components are indirectly connected, coupled, supported or contacted through a third component.

When a component is located "on" another component, this includes not only cases where a component is in contact with another component, but also cases where another component exists between the two components.

The terms "about," "substantially," and the like used throughout the present disclosure means figures corresponding to manufacturing and material tolerances specific to the stated meaning and figures close thereto, and are used to prevent unconscionable abusers from unfairly using the disclosure of figures precisely or absolutely described to aid the understanding of the present disclosure.

The term 'stream' used herein may mean a flow of a fluid in a process, and may also mean a fluid itself flowing in a pipe. Specifically, the stream may mean both the fluid itself and the flow of the fluid flowing within the pipe connecting each device. In addition, the fluid may include any at least one components of a gas, a liquid, and a solid.

Hereinafter, a separation system according to various aspects of the present disclosure will be described in detail with reference to the attached drawings.

Figure 2:
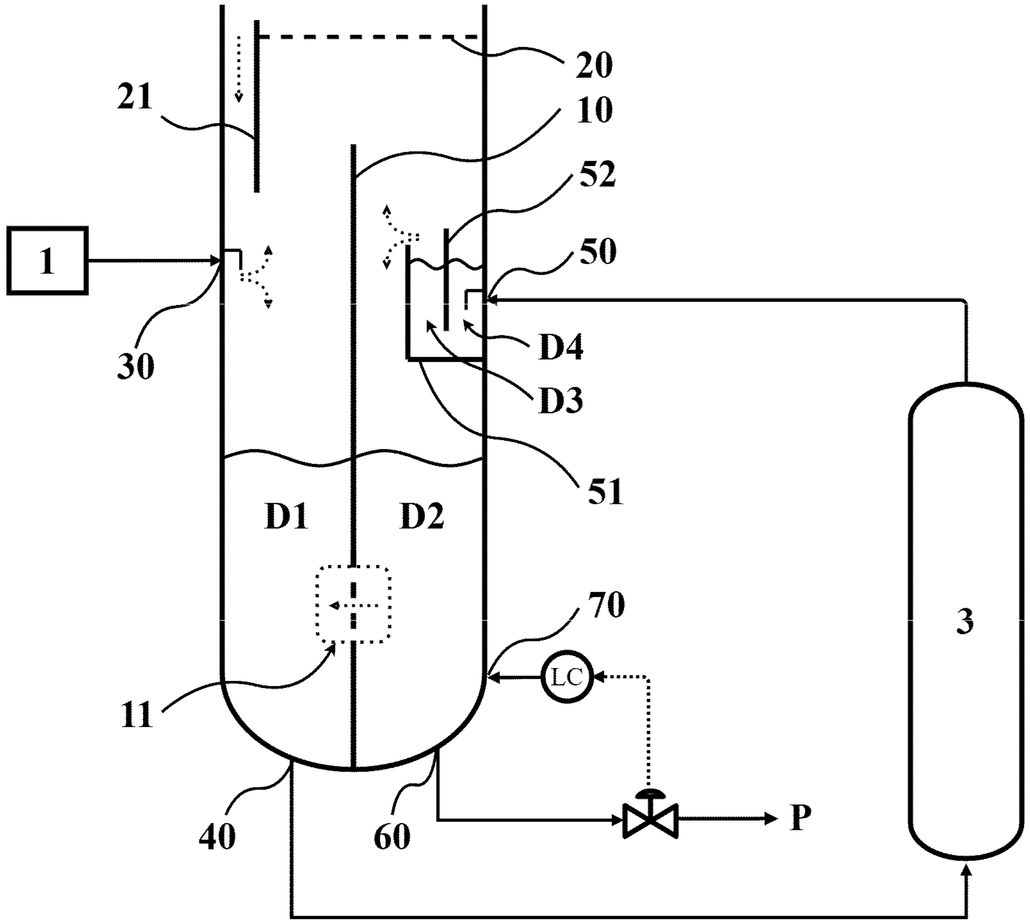
FIG. 2 is a diagram illustrating a structure of a bottom area of the separation system according to an aspect of the present disclosure.

FIG. 1 illustrates the overall structure and process flow of a separation system according to an aspect of the present disclosure, and FIG. 2 illustrates a detailed structure of a bottom area of the separation system according to an aspect of the present disclosure.

A separation system according to an aspect of the present disclosure is intended to minimize the risk of plugging due to by-products such as polymers while efficiently separating an oligomer product and an unreacted monomer contained in the reactor effluent discharged from the reactor 1 after an oligomerization process of an ethylene monomer, and referring to FIG. 1, includes a distillation column 2, a reboiler 3, and a condenser 4.

Referring to FIG. 1, an inside of the distillation column 2 may be partitioned into a bottom area A, a middle area B, and a top area C.

In this disclosure, the term "bottom area A" refers to a relatively lower portion in the structure of the distillation column 2, and may refer to, for example, the lowermost portion of three areas partitioned in a height direction of the distillation column, and more specifically, an area under the lowermost tray, that is, the lower area.

In this disclosure, the term "top area C" refers to the relatively upper portion in the structure of the distillation column 2, and may refer to, for example, the uppermost portion of three areas partitioned in the height direction of the distillation column, and more specifically, an area over the uppermost tray, that is, the upper area.

In addition, in this disclosure, "middle area B" refers to the relatively middle part in the structure of the distillation column 2, and may refer to, for example, a middle area among three areas partitioned in the height direction of the distillation column, and more specifically, an area between the bottom area and top area of the distillation column, that is, an area between the lowermost tray and the uppermost tray.

Bottom Area A

In an aspect, the bottom area A of the distillation column 2 is a first area D1 and a second area D2 partitioned with a first separation wall 10 therebetween in a sump where a liquid reactor effluent is collected. Here, the sump may refer to an area where a solution is collected at a bottom of the distillation column. In addition, the bottom area A may be partitioned into a liquid area and a gas phase area based on a liquid surface of a solution.

In addition, referring to FIG. 2, the bottom area A of the distillation column 2 may include a raw material supply port 30, a first outlet 40, a first reflux inlet 50, and a second outlet 60, and may further include a second reflux inlet 70.

The separation system according to an aspect may allow the entire unreacted ethylene to be recovered into the reactor 1 without being lost to the bottom while minimizing the risk of plugging inside a column due to polymer contained in the reactor effluent by changing the sump structure of the distillation column 2 using a separation wall.

As illustrated in FIGS. 1 and 2, the first separation wall 10 may be provided in a direction perpendicular to a cross section of the distillation column 2. In addition, the first separation wall 10 may extend from the bottom of the distillation column 2 to a predetermined height, and may be provided so as not to contact a lowermost tray of the plurality of trays 20, which will be described later.

Figure 4:
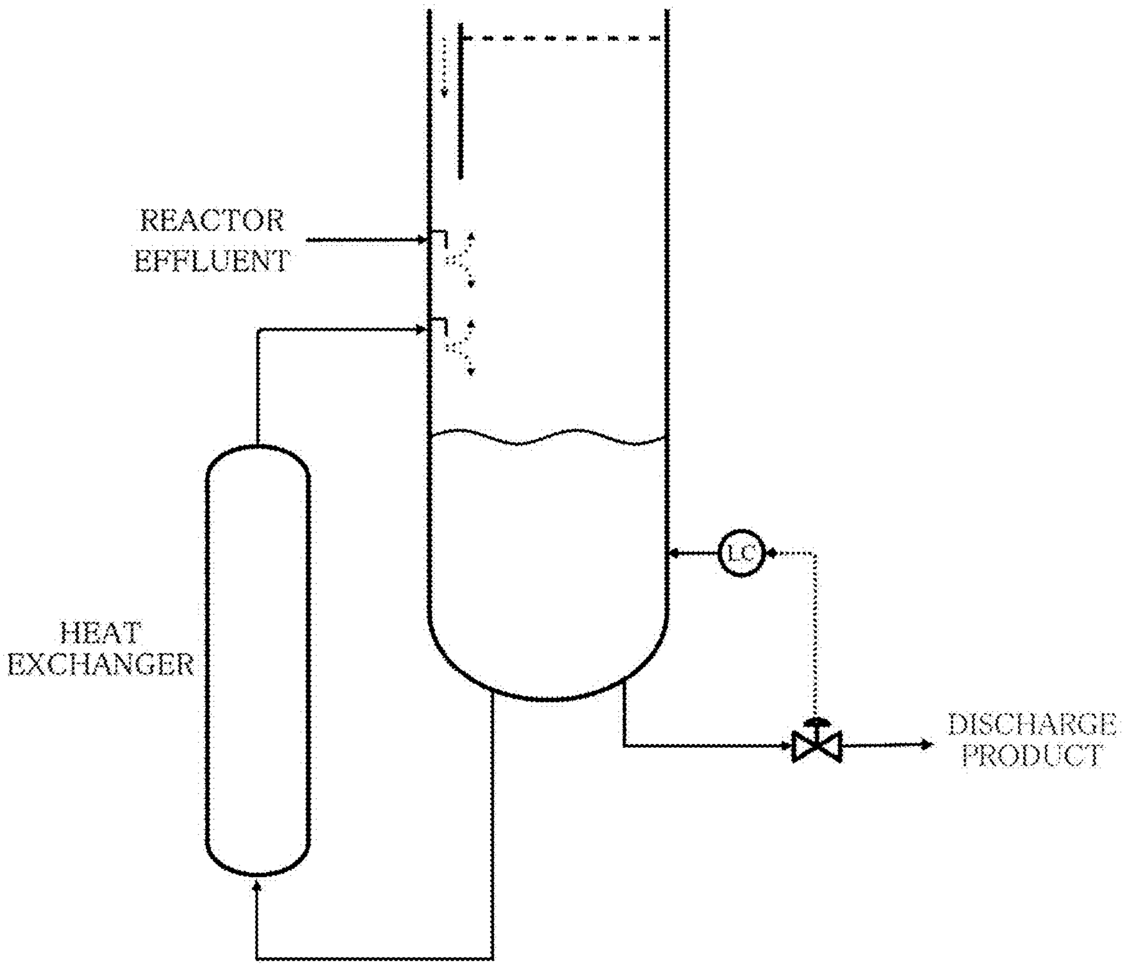
FIG. 4 Prior art
FIG. 4 is a diagram illustrating a conventional separation system as Comparative Example.

FIG. 4 illustrates a conventional separation system without a separation wall in the distillation column sump as a comparative example. Referring to FIG. 4, when the reactor effluent is injected into the bottom area where the separation wall is not provided, since areas of a stream discharged from the reboiler and a stream where products are discharged are not separated, the entire reactor effluent does not pass through a reboiler such as a heat exchanger, so there is a problem in that unreacted ethylene may be discharged directly to the lower portion along with the product.

However, in the separation system according to the present disclosure, as illustrated in FIGS. 1 and 2, the bottom area A of the distillation column 2 is partitioned into the first area D1 provided with the first outlet 40 through which the reactor effluent is discharged to the reboiler 3 and the second area D2 provided with a second outlet 60 through which a product P is discharged, and is designed so that the raw material supply port 30 is located in the first area D1 to pass the entire reactor effluent through the reboiler 3, further improving the separation efficiency of the unreacted monomers.

In addition, the first separation wall 10 is provided so as not to contact the lowermost tray among the plurality of trays 20, so gas in a gas phase area of the bottom area A can move between the first area D1 and the second area D2.

In an aspect, one area of the first separation wall 10 may be provided with an opening 11. Referring to FIGS. 1 and 2, the opening 11 is located below the liquid surface of the solution, and the flow may occur between the first area D1 and the second area D2 through the opening 11 due to a difference in flow rate between the solution in the first area D1 and the solution in the second area D2, so the solution level inside each area may be maintained the same.

Specifically, since the flow rates flowing into and out of the first area D1 and the second area D2, which exclude the flow of solution through the opening 11, are different from each other, the amounts of solutions remaining in the first area D1 and the second area D2, respectively, may be substantially different from each other without considering the flow of solution through the opening 11. In this case, the flow of solution moving from an area with a large amount of solution to an area with a low flow rate through the opening 11 occurs, and thus, the solution level may be maintained the same. When the opening 11 is not provided in the first separation wall 10, the solution level in the first area D1 and the second area D2 will be different from each other, and the mixing between the solution in the first area D1 and the solution in the second area D2 may not be expected.

It is possible to compensate for the imperfect system caused by the excessive difference between the first stream flow rate and the second stream flow rate, which will be described later, discharged from the lower portions of each of the first area D1 and the second area D2 through the opening 11. More specifically, the amount obtained by subtracting a first stream flow rate F2 discharged from the first area D1 from a flow rate F1 flowing into the first area D1 is substantially defined as a flow rate F1−F2 remaining in the first area D1 and the amount obtained by subtracting a second stream flow rate F4 discharged from the second area D2 from a flow rate F3 flowing into the second area D2 is substantially defined as a flow rate F3−F4 remaining in the second area D2, the flow rate F3−F4 remaining in the second area D2 may be substantially greater than the flow rate F1−F2 remaining in the first area D1 [(F1−F2)<(F3−F4)]. In this case, the flow of the solution in the second area D2 moving to the first area D1 through the opening 11 may occur. Here, the flow rate F1 flowing into the first area D1 includes, for example, the reactor effluent flowing from the raw material supply port 30, and may further include the solution dropping from the lowermost tray 20, which will be described later, that is, the dropping solution.

In addition, due to the solution flow from the second area D2 to the first area D1 as described above, it may help with the driving force of the distillation column sump and thus there is an advantage in that reboiler recirculation may be smoother even if reboiler head instability occurs due to the change in solution level.

The average temperature of the solution (i.e., liquid area) in the bottom area A of the distillation column 2 may range from about 200 to 210° C.

More specifically, the solution in the first area D1 may have a relatively lower average temperature than the solution in the second area D2. More specifically, the difference in average temperature between the solution in the first area D1 and the solution in the second area D2 may be about 3 to 10° C. For example, the average temperature of the solution in the first area D1 may range from about 200 to 207° C., and the average temperature of the solution within the second area D2 may range from about 203 to 210° C. Due to the difference in average temperature between the solutions in the two areas, the flowability of the solution contained in the relatively high-temperature second area D2 to the relatively low-temperature first area D1 through the opening 11 may be improved, which may additionally help with the driving force of the distillation column sump. Accordingly, it is possible to further smooth the reboiler recirculation. In addition, the effect of transferring the temperature of the solution in the second area D2, which is refluxed through the reboiler 3, to the first area D1, may be achieved.

That is, the relatively high-temperature fluid existing in the second area D2 moves to the first area D1 where the relatively low temperature fluid exists and is mixed to increase the stream (first stream) temperature introduced into the reboiler 3, thereby preventing the plugging (fouling) of pipes, etc., by the first stream, and furthermore, enabling the efficient operation of the reboiler. Furthermore, as will be described later, through the plurality of holes provided in the first separation wall 10 and its structure, the fluid mixing in the first area D1 may be achieved further smoothly.

In an aspect, the opening 11 of the first separation wall 10 may be provided with the plurality of holes having different diameters.

Figure 3:
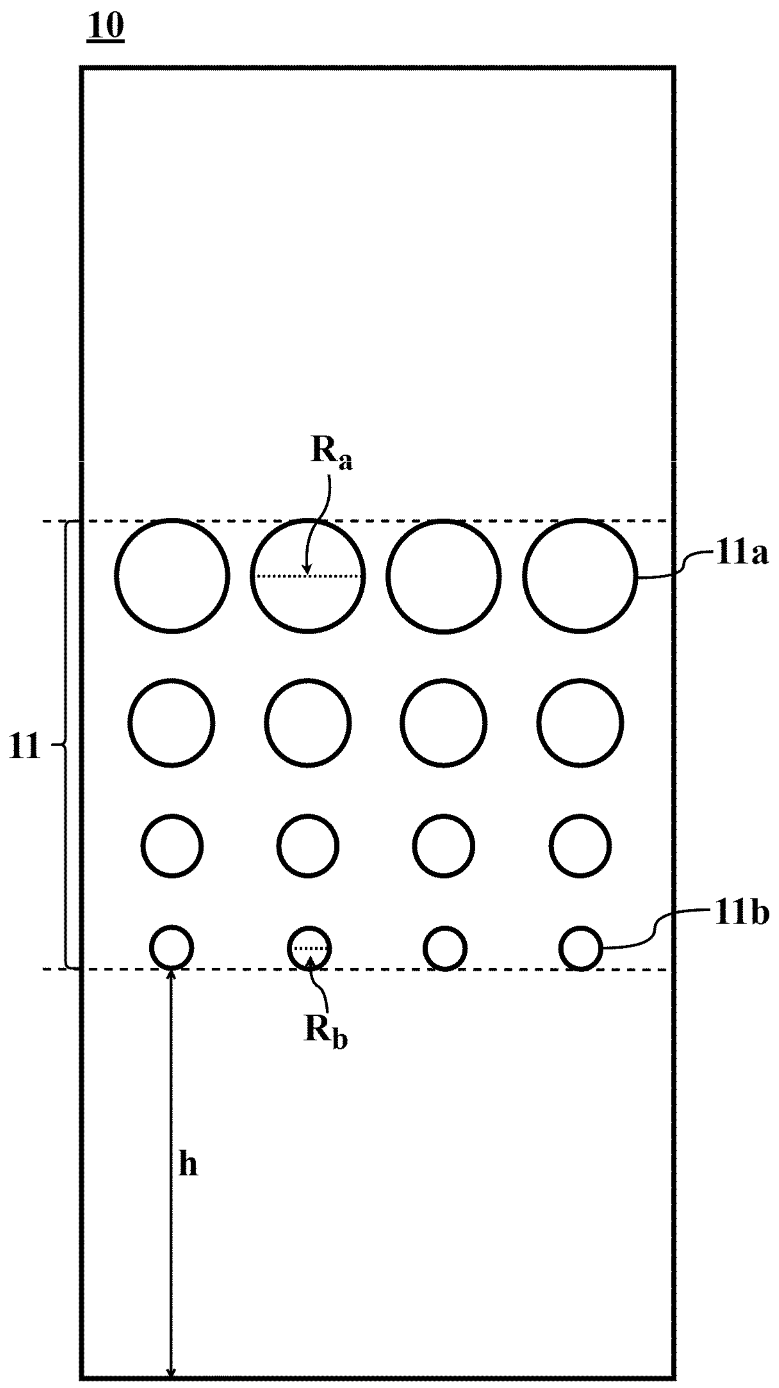
FIG. 3 is a diagram illustrating a front view of a first separation wall according to an aspect of the present disclosure.

FIG. 3 illustrates a front view of the first separation wall 10 provided with the opening 11 according to an aspect of the present disclosure.

Referring to FIG. 3, the diameter of the hole located at the upper part of the opening 11 may be gradually made smaller than that of the hole located at the lower portion thereof. For example, based on a diameter Ra of the hole 11*a* provided in the uppermost row, the diameter of the hole in the next row may be gradually smaller at a rate of about 0.5 to 0.9 times, but is not limited thereto. Accordingly, among the holes provided in the opening 11, a diameter Rb of the hole 11*b* provided in the lowermost row is the smallest, and holes with increasingly larger diameters may be provided toward the upper row, and the diameter Ra of the hole provided in the uppermost row may be the largest. Preferably, the diameter of the lower hole may be gradually smaller than that of the upper hole, so the gradually faster flow rate may be formed toward the lower portion of the opening 11. As a result, it is possible to greatly improve the mixing efficiency of the solution inside the sump.

More specifically, as described above, the flow of solution occurs from the second area D2 to the first area D1 through the opening 11. In this case, the flow rate at which the solution moves from the second area D2 to the first area D1 is relatively slow in the upper portion of the opening 11 provided with a hole with a larger diameter, and the flow rate at which the solution moves from the second area D2 to the first area D1 is relatively fast in the lower portion of the opening 11 provided with a hole with a smaller diameter. In this way, due to the fast flow rate generated at the lower portion, the solution in the first area D1 swirls upward, which may help the reactor effluent flowing in at a relatively low temperature, the dropping liquid of the lowermost tray to be described later and the solution inside the sump to be smoothly mixed in the first area D1.

In an aspect, the diameter of the plurality of holes may range from about 10 to 50 mm. More specifically, the diameter Ra of the hole located at the uppermost portion of the opening 11, that is, the uppermost hole 11*a*, may range from about 40 to 50 mm, and the diameter Rb of the hole located at the lowermost portion of the opening 11, that is, the lowermost hole 11*b*, may range from about 10 to 15 mm. When the above diameter range is satisfied, due to the relatively large diameter of the uppermost hole 11*a*, the water levels in the first area D1 and the second area D2 may be maintained the same without generating a large differential pressure between the two areas. In addition, by setting the diameter of the lowermost hole 11*b* to at least 10 mm, it is possible to secure a stable solution flow by excluding the possibility of hole plugging (fouling) phenomenon due to the by-products such as polymer.

In addition, the diameter Ra of the uppermost hole 11*a* compared to the diameter Rb of the lowermost hole 11*b* may satisfy the range of 1:3 to 1:5. When the above ratio range is satisfied, the difference in flow rate may occur between the upper and lower portions of the opening 11, allowing the smooth mixing between the solution in the first area D1 and the solution in the second area D2.

In an aspect, as illustrated in FIG. 3, the holes located at the same height (row) among the openings 11 may have the same diameter, and the number of holes in each row may be the same. For example, when the number of holes located at the lower portion is relatively small, the solution flow is concentrated at the upper portion, which may limit the smooth mixing, and when the number of holes located at the upper portion is relatively small, the differential pressure may occur between the first and second areas, thereby accelerating the plugging phenomenon due to the by-products. Therefore, in the separation system according to an aspect of the present disclosure, the holes located at the same height (row) among the openings 11 may have the same diameter, and the number of holes in each row may be also the same, so the solution flow is concentrated in some areas of the upper and lower portions of the opening 11, thereby preventing the smooth mixing from being limited. In addition, by preventing the pressure differential between the first area D1 and the second area D2 from occurring, it is possible to prevent the plugging phenomenon due to the by-products.

In an aspect, the lowest hole 11*b* may be located at a height h of about 150 to 300 mm from the bottom of the distillation column 2. When the height h range is satisfied, the second stream may be prevented from being influenced by the first stream, thereby preventing the flow rate instability from occurring in the second stream. Specifically, when the second stream, which is the discharge flow of the second area D2, is influenced by the first stream, which is the discharge flow of the first area D1, an opening and closing range of a water level control valve may change significantly, so the flow rate instability of the second stream may occur.

The raw material supply port 30 is connected to the reactor 1, is located in the upper portion of the first area D1, and is provided on the side portion of the distillation column 2. The reactor effluent containing the ethylene and oligomer may be supplied to the first area D1 through the raw material supply port 30. More specifically, the raw material supply port 30 may be located at a height between the upper end of the first separation wall 10 and the liquid surface of the solution in the first area D1, but is not limited thereto.

As in the related art, when the reactor effluent is injected into the feed end tray corresponding to the middle area, there is a risk of plugging phenomenon due to the polymer. However, in the present disclosure, the raw material supply port 30 is located in the bottom area A to prevent the column plugging phenomenon.

Here, the reactor effluent includes an oligomer product (alpha-olefin, P) produced by the oligomerization reaction of the ethylene monomer performed in the reactor 1 and the ethylene as the unreacted monomer, and may further include a polymer as a by-product.

The oligomerization reaction may refer to a reaction in which a monomer is polymerized. Depending on the number of monomers to be polymerized, trimerization and tetramerization are called, and these trimerization and tetramerization are collectively called multimerization.

Alpha-olefin is widely used commercially as an important material used as a comonomer, a detergent, a lubricant, a plasticizer, and the like. In particular, 1-hexene and 1-octene has been widely used as a comonomer for controlling a density of polyethylene in a production of linear low-density polyethylene (LLDPE). The alpha-olefins such as 1-hexene and 1-octene may be produced, for example, through trimerization or tetramerization of ethylene.

The first outlet 40 is provided at the bottom of the lower portion of the first area D1 of the distillation column 2 and is connected to one side of the reboiler 3. The first stream containing the reactor effluent may be discharged to the reboiler 3 through the first outlet 40. As described above, since both the reactor effluent containing the unreacted monomer and the dropping liquid of the lowermost tray flow into the first area D1, the entire unreacted monomer may be discharged through the first outlet 40 located at the lower portion of the first area D1 and guided to pass through the reboiler 3.

The second outlet 60 is provided at the bottom of the lower portion of the second area D2 of the distillation column 2. The second stream containing the oligomer product P may be discharged through the second outlet 60.

Referring to FIG. 4 illustrating the conventional separation system in which the separation wall is not provided in the distillation column sump, when the reactor effluent is injected into the bottom area without the separation wall, the areas of the stream discharged from the reboiler and the stream discharged with the product are not separated, so the entire reactor effluent does not pass through the reboiler (heat exchanger). As a result, there is a problem of reducing the separation efficiency due to the discharge of the unreacted ethylene to the bottom along with the product.

Meanwhile, in the separation system according to the present disclosure, the bottom area A of the distillation column 2 is partitioned into the first area D1 provided with the first outlet 40 through which the reactor effluent is discharged to the reboiler 3 and the second area D2 provided with a second outlet 60 through which a product P is discharged by the first separation wall 10, and is designed so that the raw material supply port 30 is located in the first area D1 to pass the entire reactor effluent through the reboiler 3, thereby maximizing the separation efficiency.

The first reflux inlet 50 is located in the upper portion of the second area D2, is connected to the other side of the reboiler 3, and is provided on the side portion of the distillation column 2. More specifically, the first reflux inlet 50 may be located at a height between the upper end of the first separation wall 10 and the liquid surface of the solution in the second area D2, and may also be located at a lower height than the raw material supply port 30, but is not limited thereto.

The first stream passing through the reboiler 3 may be refluxed to the second area D2 through the first reflux inlet 50. The first stream flowing into the second area D2 through the first reflux inlet 50 is heated while passing through the reboiler 3, so the average temperature of the second area D2 is higher than that of the first area D1.

In an aspect, the bottom area A may be further provided with an auxiliary separation structure for separating the unreacted gas (light gas) such as ethylene remaining in the first stream that has passed through the reboiler 3.

Referring to FIG. 2, the auxiliary separation structure includes an auxiliary tray 51 and a second separation wall 52.

The auxiliary tray 51 may have a structure provided with side walls and a bottom to accommodate the first stream that has passed through the reboiler 3 flowing in from the first reflux inlet 50. In addition, the side walls of the auxiliary tray 51 may be spaced apart to be parallel to the first separation wall 10. In addition, the upper end of the side wall of the auxiliary tray 51 may be located at a height lower than the upper end of the first separation wall 10.

In an aspect, the second separation wall 52 may be located inside the auxiliary tray 51 and may be partitioned into a third area D3 and a fourth area D4. The second separation wall 52 is spaced apart to be parallel to the side wall of the auxiliary tray 51, and the lower portion of the second separation wall 52 may be disposed to be spaced apart so as not to contact the bottom of the auxiliary tray 51. In addition, the upper end of the second separation wall 52 may be located at a higher height than the upper end of the side wall of the auxiliary tray 51, and may be located at a height lower than the upper end of the first separation wall 10.

Referring to FIG. 2, when the area located toward the center of the distillation column 2 based on the second separation wall 52 is the third area D3 and the area where the first reflux inlet 50 is located is the fourth area D4, the solution of the first stream that has passed through the reboiler 3 from the first reflux inlet 50 flows into the fourth area D4, and the gas moves upward. Subsequently, the solution moves to the third area D3 through the separated space between the second separation wall and the bottom of the auxiliary tray 51, and the gas (unreacted gas) remaining dissolved in the solution in the third area D3 is further separated and moves upward, and the liquid moves to the lower portion of the second area D2. In this case, the solution level inside the third area D3 and the fourth area D4 may be the same.

As described above, the stable column operation may be possible by separating the unreacted gas remaining dissolved in the liquid stream, which has passed through the reboiler 3, through an auxiliary separation structure once more. More specifically, when the excessive amount of gas-liquid mixture flow, which has passed through the reboiler 3, does not secure sufficient residence time in the process of passing through the auxiliary tray 51 to the second area D2, the unreacted gas remaining dissolved in the solution may be discharged together into the second area D2, but by including the second separation wall 52, it is possible to secure the residence time during which the remaining unreacted gas in the solution may be separated, thereby supplementing the problem of the remaining unreacted gas flowing into the second area D2.

Referring to FIG. 2, the second reflux inlet 70 may be connected to the second outlet 60, located at the lower portion of the second area D2, and provided on the side portion of the distillation column 2. Some of the second stream may be refluxed to the second area D2 through the second reflux inlet 70. More specifically, the second reflux inlet 70 is located below the first reflux inlet 50 and may be located below the liquid surface of the solution in the second area D2, but is not limited thereto.

Middle Area B

According to an aspect of the present disclosure, the middle area B of the distillation column 2 includes the plurality of trays 20. The plurality of trays 20 are arranged horizontally with the cross section of the distillation column 2 and are provided to be spaced apart from each other.

The gaseous stream containing the unreacted gas generated in the bottom area A passes through the plurality of trays 20 provided in the middle area B, and moves to the top area C which will be described later.

In the separation system according to an aspect of the present disclosure, one end of the lowermost tray 20 among the plurality of trays is located in the upper portion of the first area D1, and the separation system may further include a guide partition wall 21 extending downward from one end of the lowermost tray 20. One end of the lowermost tray 20 may be open so as not to contact the side portion of the distillation column 2.

More specifically, the dropping liquid separated from the lowermost tray 20 after contact with gas and liquid may be guided to the first area D1 through the guide partition wall 21. Since the unreacted ethylene may be dissolved in the solution (dropping liquid) that drops from the tray, the guide partition wall 21 is provided at the end of the lowermost tray to design the solution that drops from the tray to flow only into the first area D1, thereby preventing the product from being lost directly to the second outlet 60, which is the product outlet, without passing through the reboiler 3.

The number and type of the plurality of trays 20 may be appropriately selected in consideration of the type of distillation column 2 and the desired separation efficiency, and the type of tray may be used without particular restrictions as long as it is a tray normally used in a distillation column for gas-liquid separation.

Top Area C

According to an aspect of the present disclosure, the top area C is connected to the condenser 4. More specifically, the upper gaseous stream containing the unreacted ethylene that has passed through the plurality of trays in the middle area B may be discharged to the condenser 4. The upper gaseous stream discharged to the condenser may be condensed and recovered to the reactor 1, but is not limited thereto.

Hereinabove, exemplary aspects of the separation system according to the present disclosure have been described and illustrated in the drawings. However, the above description and the illustration of the drawings illustrate only the core components for understanding the present disclosure. In addition to the processes and devices in the description and illustrated in the drawings, the processes and devices not separately described or illustrated may be appropriately applied and used to implement the separation system according to the present disclosure.

In addition, those skilled in the art will understand that various changes and modifications are possible without departing from the concept and scope of the following claims.

DESCRIPTION OF REFERENCE SIGNS

1: Reactor
2: Distillation column
3: Reboiler
4: Condenser
A: Bottom Area
B: Middle Area
C: Top Area
10: First separation wall
11: Opening
20: Tray
21: Guide partition wall
30: Raw material supply port
40: First outlet
50: First reflux inlet
51: Auxiliary tray
52: Second separation wall
60: Second outlet
70: Second reflux inlet
D1: First area
D2: Second area
D3: Third area
D4: Fourth area

The invention claimed is:

1. A separation system, comprising:

a distillation column with a separation wall, a reboiler, and a condenser, wherein the distillation column includes a bottom area including a first area and a second area partitioned with a first separation wall therebetween, a middle area including a plurality of trays, and a top area connected to the condenser, wherein the bottom area includes:

a raw material supply port that is provided at an upper portion of the first area and that is configured to transfer a reactor effluent containing ethylene and oligomer to the first area;

a first outlet that is provided at a lower portion of the first area and that is configured to discharge a first stream containing the reactor effluent;

a first reflux inlet that is provided at an upper portion of the second area and that is configured to pass the first stream from the reboiler and reflux it into the second area; and a second outlet that is provided at a lower portion of the second area and that is configured to discharge a second stream containing the oligomer, wherein the first separation wall includes an opening comprising a plurality of holes having different diameters; and wherein the first area contains no trays.

2. The separation system of claim 1, wherein a diameter of a hole located at a lower portion of the opening is smaller than a diameter of a hole located at an upper portion of the opening.

3. The separation system of claim 2, wherein a diameter of a hole located at an uppermost portion of the opening is 1:3 to 1:5 compared to a diameter of a hole located at a lowermost portion of the opening.

4. The separation system of claim 1, wherein each of the plurality of holes have a diameter of 10 to 50 mm.

5. The separation system of claim 1, wherein a hole located at a lowermost portion of the opening is located at a height of 150 to 300 mm from a bottom of the distillation column.

6. The separation system of claim 1, wherein a solution in the first area has a relatively lower average temperature than a solution in the second area.

7. The separation system of claim 1, wherein an average temperature of a solution in the first area is 200 to 207° C., and an average temperature of a solution in the second area is 203 to 210° C.

8. The separation system of claim 1, wherein the opening is configured such that a portion of a solution in the second area moves to the first area through the opening.

9. The separation system of claim 1, wherein the bottom area further includes:

an auxiliary tray that has a side wall and a bottom, the auxiliary tray configured to receive the first stream refluxed from the first reflux inlet; and a second separation wall that is located inside the auxiliary tray and that partitions the auxiliary tray into a third area and a fourth area, wherein a lower portion of the second separation wall is spaced apart from a bottom of the auxiliary tray so as not to contact the bottom of the auxiliary tray.

10. The separation system of claim 1, further comprising:

a guide partition wall that is located at an upper portion of the first area and extends in a downward direction from an end of a lowermost tray among the plurality of trays.

11. The separation system of claim 10, wherein the guide partition wall is configured such that a liquid flows from of the lowermost tray into the first area along the guide partition wall.

12. The separation system of claim 1, wherein the bottom area further includes a second reflux inlet that is connected to the second outlet, wherein the second reflux inlet is provided on a side portion of the second area, and wherein the second reflux inlet is configured such that a portion of the second stream refluxed to the second area.

* * * * *